UNITED STATES PATENT OFFICE.

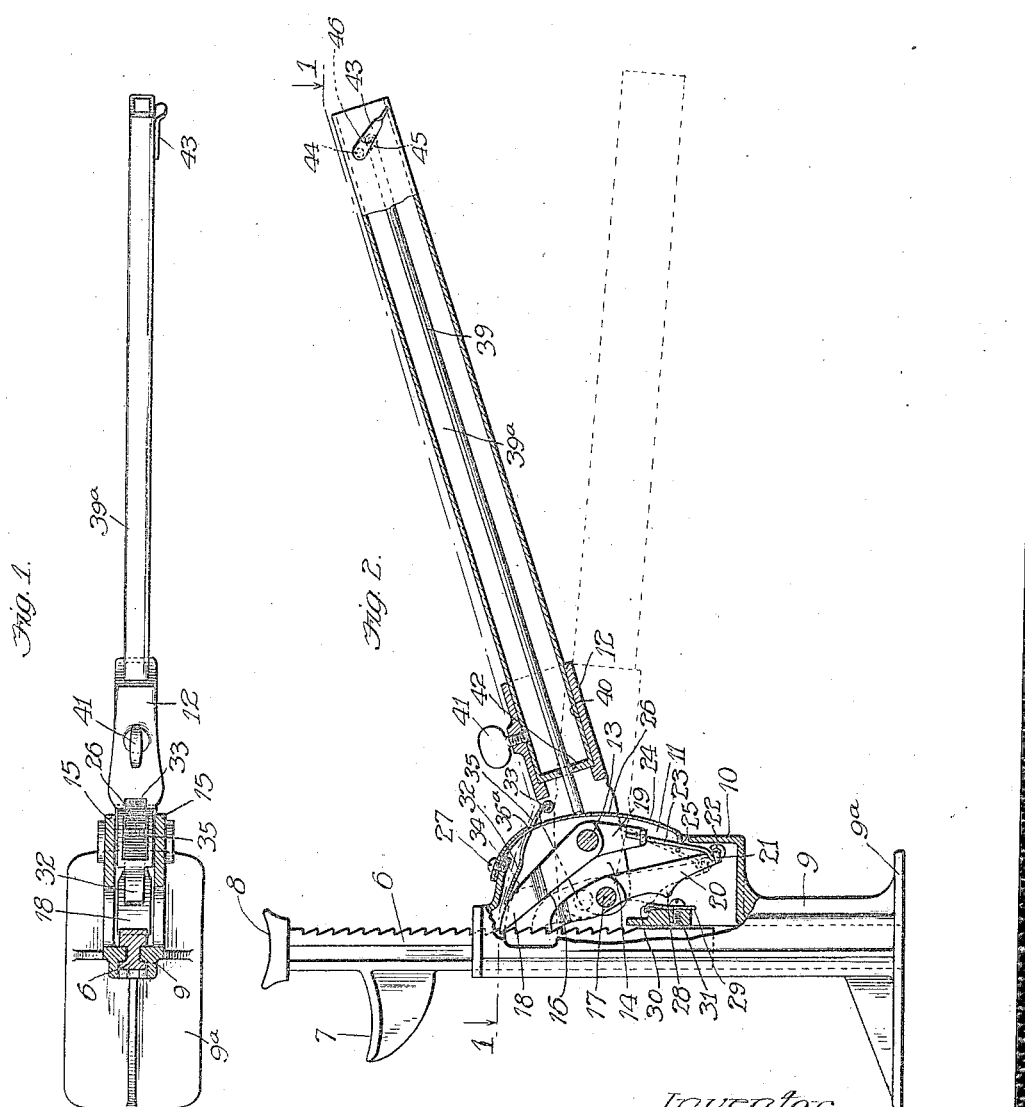

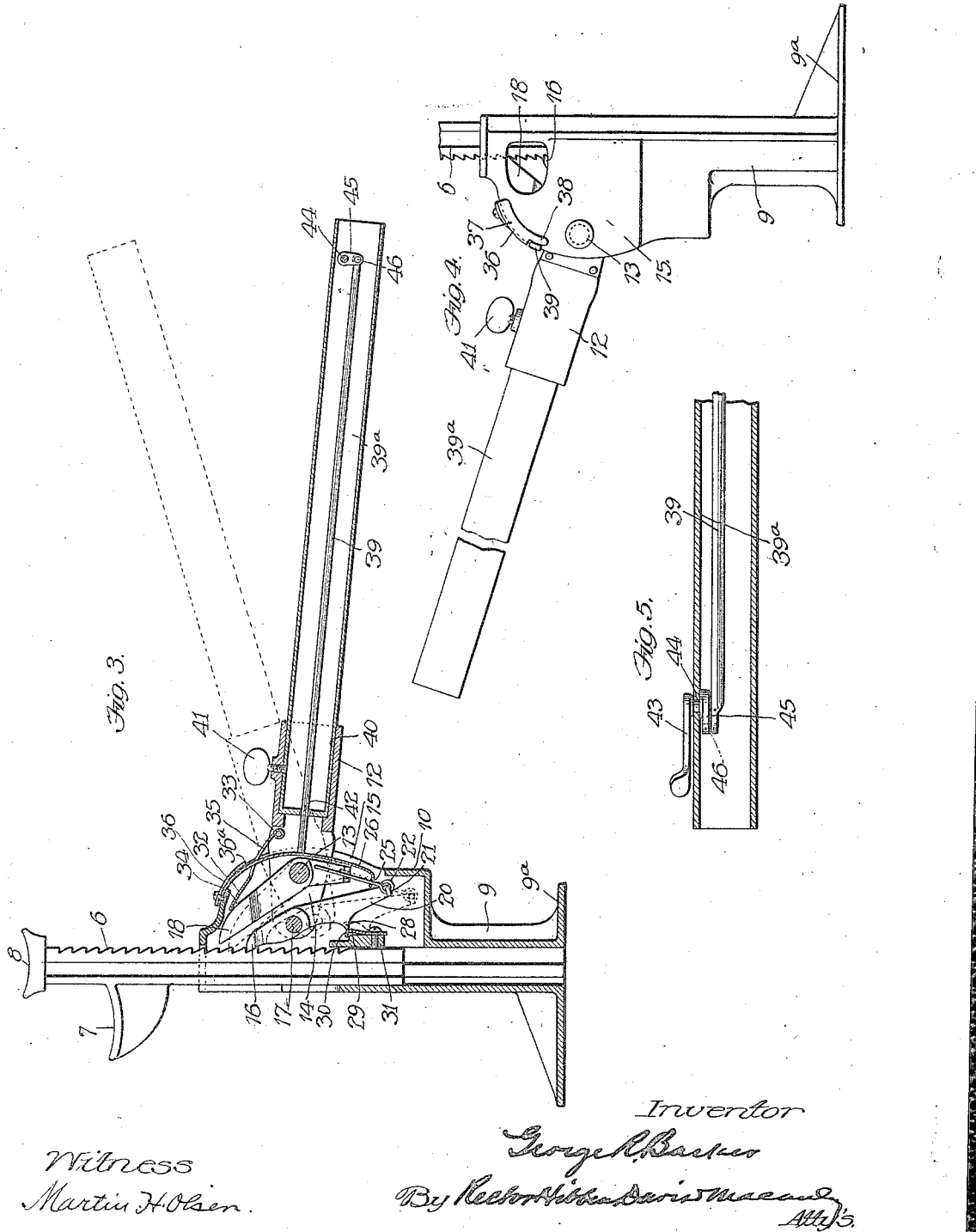

GEORGE R. BARKER, OF JOLIET, ILLINOIS, ASSIGNOR TO WILLIAM E. PRATT, OF CHICAGO, ILLINOIS.

AUTOMOBILE AND CARRIAGE JACK.

1,424,147.   Specification of Letters Patent.   Patented Aug. 1, 1922.

Application filed July 26, 1920. Serial No. 399,137.

*To all whom it may concern:*

Be it known that I, GEORGE R. BARKER, a citizen of the United States, residing at Joliet, county of Will, and State of Illinois, have invented certain new and useful Improvements in Automobile and Carriage Jacks, of which the following is a specification.

In the class of jacks to which my invention relates a rack bar carrying a support for a car axle or the like is mounted to slide vertically in a standard adapted to be supported on a floor or pavement. The rack bar is supported at any elevation to which it may be raised by the engagement of a pawl with the corresponding tooth of the rack. The rack bar and support are raised and lowered by a second pawl which is pivoted on a lever or handle so as to be raised or lowered the space of a tooth by swinging the handle up and down. In the operation of raising the rack bar and support the first mentioned pawl engages the rack while the pawl pivoted on the handle is being lowered. In the operation of lowering the rack, however, the first-mentioned or holding pawl engages the rack as the pawl carried by the handle moves upward out of contact with the teeth. Means are provided whereby the action of the pawls may be reversed according as it is desired to raise or lower the rack bar. In the jacks in common use in order to effect such reversal of operation it has been necessary to directly manipulate the pawls which is very awkward and inconvenient by reason of the position of the jack beneath the wagon or car. It is the object of my invention to produce a simple, practical and efficient jack which may be conveniently manipulated by the operator to change the action of the device without leaving the position which he naturally occupies at the end of the handle when swinging the latter. Other features of the invention will be apparent from the following description of the preferred form thereon in connection with the drawings. It is to be understood however that the specific disclosure is for the purpose of exemplification only and that the scope of the invention is defined in the following claims.

In the drawings Fig. 1 is a plan of my improved jack partly in horizontal section on the line 1—1 of Fig. 2; Fig. 2 a side elevation, partly in vertical section, thereof, showing the parts in position for lifting the rack bar; Fig. 3 a vertical section of the same partly in elevation showing the parts in position for lowering the rack and support; Fig. 4 a fragmentary side elevation of the device; and Fig. 5 a longitudinal detail of the handle on an enlarged scale.

As shown in the drawings the rack bar 6 has formed integral therewith supports 7, 8 and is vertically guided in the standard 9 having a base 9ª. The standard is formed with a housing 10 opening into the channel in which the rack bar slides and said housing is formed with an opening 11 to receive the end of the handle casting 12. The latter is fulcrumed on a pivot pin 13 extending through the bifurcated end 14 of the casting and the side walls 15 of the housing, said pin being headed over upon the latter. A traveling pawl 16 is pivoted on the pin 17 between the members of the inner bifurcated end of the handle casting in such position as to engage the teeth of the rack and the holding pawl 18 is likewise pivoted between the forks of the handle casting on the pivot 13 of the latter. Pawl 18 is formed with a tail 19 and the pawl 16 with a tail 20, and the tail of the latter is formed with an offset ear 21 in which is pivoted the eye 22 of a rod 23, the other end of which extends through a similar ear 24 on the tail 19. Intermediate the ears 21 and 24 said rod extends through a perforation 25 in the end of a spring 26, the other end of which is anchored to the upper wall of the housing by a screw 27. Normally the spring 26 exerts a pull upon the rod 23 in a direction away from the rack and consequently the pawls are yieldingly pressed against the rack and when the handle is moved up and down to reciprocate the traveling pawl on the handle the rack bar will move upward step-by-step the distance of a tooth at a time in an obvious manner. See Fig. 2.

In order to lower the rack bar and support when desired the spring 26 is pressed inward by means to be hereinafter described so that it exerts a pressure against the tails of the respective pawls tending to throw the points of said pawls out of engagement with the rack. This operation and the position of the parts therefor is best shown in Fig. 3. In order to throw the traveling pawl 16 into engagement with the rack at the upper end of its stroke, i. e., when the lever is lowered to the dotted line position in the full line position in Fig. 3, the tail 20 of said pawl is formed on its surface adjacent the rack bar with a hump 28, and a spring 29 having a cam-shaped upper end 30 is secured at 31 to the housing casting in such position that as said traveling pawl nears the upper end of its stroke the hump on the tail thereof engages the cammed end of the spring, throwing the tail of the pawl outward and the point thereof inward into engagement with the rack. In Fig. 3 the parts are shown in full lines in the positions which they occupy when the handle is lowered, or in other words when the traveling pawl is in its uppermost position and in dotted lines in the other extreme position. From the dotted lines it will be observed that as the traveling pawl is lowered the hump on the tail thereof leaves the spring 29, permitting the point of the traveling pawl to be disengaged from the rack. This disengagement however does not take place until the holding pawl 18 is again in position to engage the rack. This movement of the pawl 18 against the pressure of the spring 26 is effected by a spring finger 32 which is pivoted at 33 upon the handle casting and rides upon the outer or upper surface of pawl 18 at 34. As seen in Figs. 1, 2 and 3, the pivoted finger is slotted at 35 and spring 26 extends loosely through the slot so as not to interfere with the movement of the finger. For the greater part of its movement with the handle casting finger 32 rides upon the pawl 34. As the handle approaches the upper limit of its movement, however, the finger engages the lower edge 36ª of a cover plate 36 which is secured at the upper end of the opening in the housing by the screw 27 which secures the spring 26. The plate 36 is formed at its side edges with downwardly projecting flanges 37 which are extended at their respective lower ends into ears 38 which latter extend under lugs 39 cast upon and projecting laterally from the housing, said lugs and ears being for the purpose of securing the lower edge of the plate firmly in position. Following the action of the jack as shown in Fig. 3 with the spring 26 forced into its inner position in which it exerts pressure tending to release the pawls from the rack, when the handle is elevated to the dotted line position the pivoted finger 32 engaging the lower edge of the cover plate forces the point of the holding pawl into engagement with the rack. At about the same time or a little while thereafter the traveling pawl is forced out of engagement with the rack by the pressure of spring 26. As the handle is lowered to raise the traveling pawl the hump on the tail of the latter engages the spring 29 and forces the point of the traveling pawl into engagement with the rack and the finger 32 having in the meantime released the holding pawl 18, the latter is thrown out of engagement with the rack by the spring 26. As the handle is lifted the rack descends with the traveling pawl until the holding pawl is again forced into engagement with the rack permitting the traveling pawl to be released therefrom.

The spring 26 may be controlled as to its two positions by any suitable means but I prefer to employ for this purpose a rod 39 which is movable longitudinally of the handle. The latter obviously might be made in one piece with the handle casting, but preferably I form the latter with a socket 40 in which the handle is removably secured by a thumb-screw 41. The handle may be made hollow as shown, and rod 39ª is guided at its inner end through a perforation 42 into register with the spring 26. At a convenient point toward the operating end of the handle a finger lever 43 is fulcrumed in the handle at 44 and provided inside the latter with an arm 45 which is pivoted to the rod 39ª at 46. These parts are so proportioned and arranged that when the finger lever is in one extreme position the rod 39ª is withdrawn from contact with spring 26, but when the finger lever is in the opposite position the rod 39ª forces spring 26 into the inner position in which it is adapted to effect the lowering of the rack bar.

I claim:

1. In a jack, a standard, a rack sliding therein, a support on the rack, a holding pawl, a hand lever, a traveling pawl on the hand lever, a link connecting the pawls, a spring engaging the link and normally exerting pressure thereon to force the pawls into engagement with the rack, means movable longitudinally of the handle for shifting the spring to exert pressure on the pawls tending to withdraw them from the rack, means for throwing the holding pawl against the rack when the handle is raised, and means for throwing the traveling pawl against the rack when the handle is lowered.

2. In a jack, a standard, a rack sliding therein, a support on the rack, a holding pawl, a hand lever, a traveling pawl on the hand lever, a spring, means connecting the spring to the two pawls, said spring normally exerting pressure on both said pawls to force the latter into engagement with the rack, means for shifting the spring to exert pressure on the pawls tending to withdraw them from the rack, a pivoted finger on the handle and engaging the holding pawl and adapted to force the latter into contact with the rack when the handle is raised, and means for throwing the traveling pawl against the rack when the handle is lowered.

3. In a jack, a standard, a rack sliding therein, a support on the rack, a holding pawl, a hand lever, a traveling pawl on the hand lever, a link connecting the pawls, a housing enclosing the pawls and in which the hand lever is pivoted having an opening through which the hand lever extends, a spring secured to the casing extending partially over said opening and engaging the link and means movable longitudinally of the handle adapted to engage said spring and move it inward to a position in which it tends to retract the pawls.

4. In a jack, a standard, a rack sliding therein, a support on the rack, a holding pawl, a hand lever, a traveling pawl on the hand lever, a link pivoted to one of said pawls and loosely engaging the other, a housing enclosing the pawls and in which the hand lever is pivoted, said housing having an opening through which the hand lever extends, a spring secured at one end to the housing above the opening therein, extending partially over the opening and engaging the link, a finger pivoted to the hand lever, extending through the opening and engaging the holding pawl, and longitudinally movable means on the handle for engaging said spring and moving it to a position where it tends to retract the pawls.

GEORGE R. BARKER.